Jan. 30, 1945.    S. VERNET    2,368,182
SHUTTER CONTROLLING DEVICE
Filed June 28, 1943    2 Sheets-Sheet 1

INVENTOR
Sergius Vernet
BY Andrew K. Foulds
his ATTORNEY

Jan. 30, 1945.  S. VERNET  2,368,182
SHUTTER CONTROLLING DEVICE
Filed June 28, 1943  2 Sheets-Sheet 2

INVENTOR
Sergius Vernet
BY Andrew K. Foulds
his ATTORNEY

Patented Jan. 30, 1945

2,368,182

UNITED STATES PATENT OFFICE 2,368,182

SHUTTER CONTROLLING DEVICE

Sergius Vernet, Yellow Springs, Ohio, assignor to Vernay Patents Company, Yellow Springs, Ohio, a corporation of Delaware Application June 28, 1943, Serial No. 492,529

6 Claims. (Cl. 297—3)

This invention relates to new and useful improvements in a thermostatic device which is particularly adapted among other uses for operating air flow controlling shutters or louvres.

An object of the invention is to provide a thermostatic device which is capable of exerting a large operating force.

Another object is to provide a device which is capable of adjustment to accommodate it to different relative positions of parts with which it is to cooperate.

The invention consists in the improved construction and cooperative relation of parts, to be more fully described hereinafter, and the novelty of which will be particularly pointed out and distinctly claimed.

Figure 1:
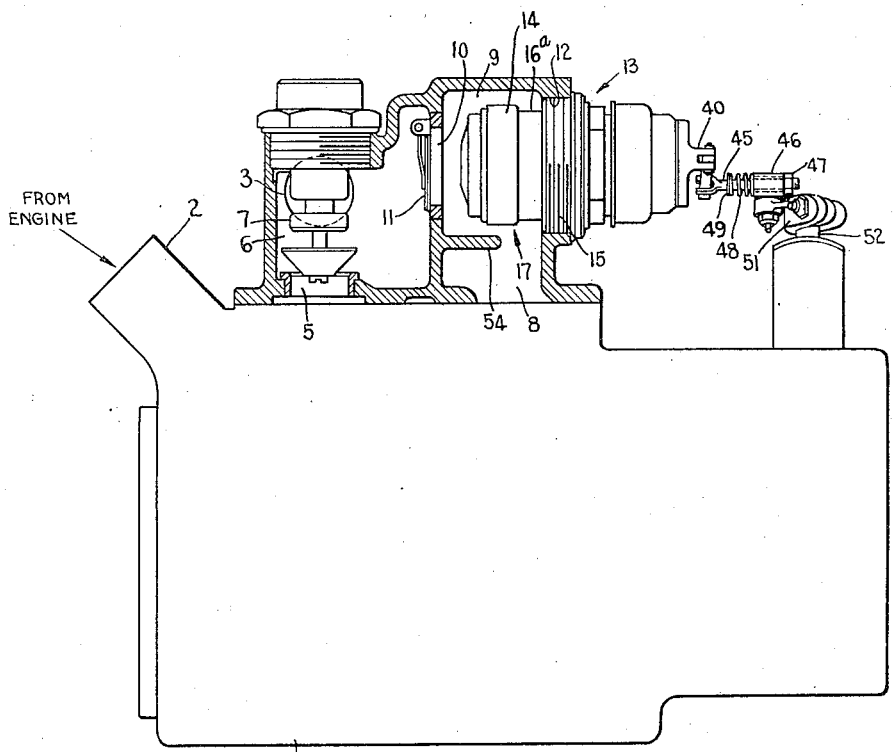
Figure 4:
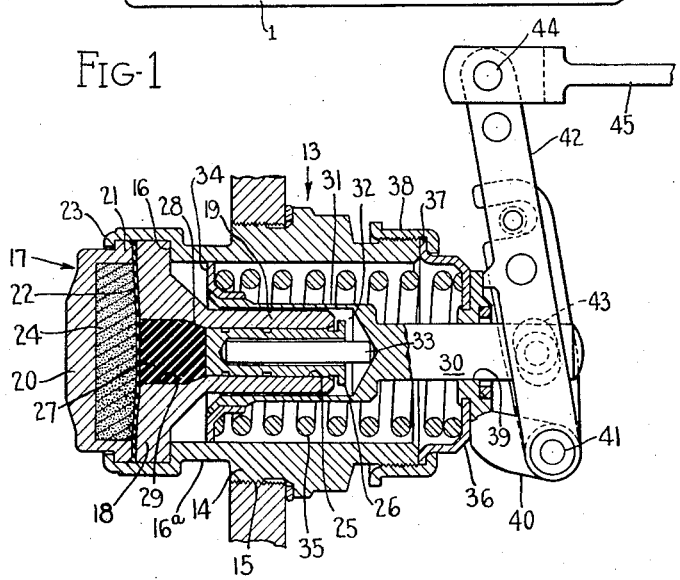
Figure 2:
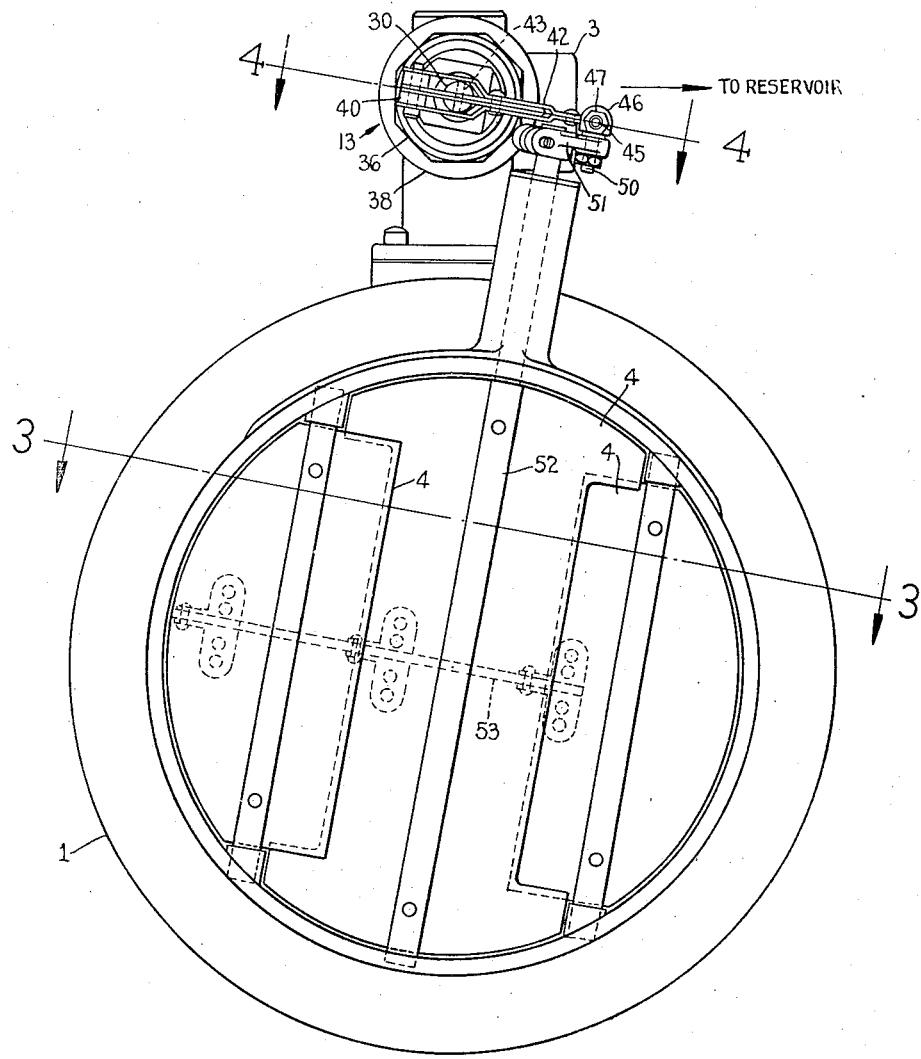
Figure 3:
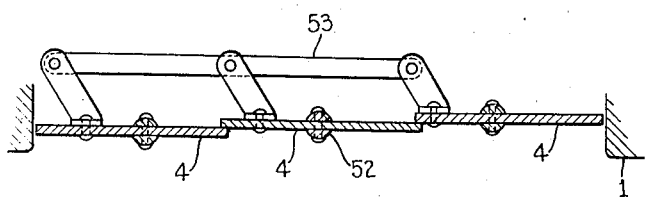

In the accompanying drawings, to be taken as a part of this specification, there is fully and clearly illustrated a preferred embodiment of the invention, in which drawings Figure 1 is a view in side elevation and partly in vertical section, showing an oil cooling apparatus with the thermostatic control operatively positioned therein, Fig. 2 is a view in end elevation looking from the right of Fig. 1, Fig. 3 is a detail view of the shutters or louvres, taken on line 3—3 of Fig. 2, and Fig. 4 is a view in longitudinal central section through the control device and taken on the line 4—4 of Fig. 2.

Referring to the drawings by characters of reference, 1 designates generally the housing of an oil cooler for cooling the lubricating oil of aircraft engines, for example. The cooler 1 has an oil inlet 2 leading from the engine (not shown) and an outlet 3 leading to an oil reservoir (not shown) which supplies the engine. In the cooler 1 there are the usual passes for flow of the oil in heat exchange relation with cooling air which may be admitted through the louvres or shutters 4. In normal flow, the engine heated oil flows through a by-pass in the cooler and direct to the by-pass port 5 which opens into the chamber 6 having the outlet 3. If the temperature of the oil exceeds a desired degree, say 130° F., the thermostatic valve 7 in the chamber 6 moves to close the port 5. Oil from the engine is now required to flow through the oil cooling passes in the cooler 1 and thence to the inlet port 8 of the chamber 9. A port 10 connects the chamber 9 to the chamber 6 and is controlled by a check valve 11 opening outward from the chamber 9. Extending through and secured in an outer wall screw threaded opening 12 of the chamber 9 opposite the check valve opening 10, there is a thermostatic control device 13 for operating the shutters 4.

The device 13 which is responsive to the temperature of the lubricating oil entering the chamber 9 through the port 8, has a tubular open-ended housing 14 which is externally screw threaded substantially midway of its ends, as at 15, for threaded engagement in the opening 12. The inner end portion of the housing 14 has an internal annular shoulder 16. Between the shoulder 16 and the threaded portion 15, the inner end housing portion 14 has a circumferential channel providing a neck or housing wall portion 16ª of thinned-out cross section or reduced thickness. This wall portion 16ª serves as a dam or baffle to heat flow between the external portion of the housing 14 and the inner end portion of the housing 14 within chamber 9. Fitting within the bore of the housing 14 and seating against the shoulder 16, there is a thermostat casing 17 having a cover member 18 with its periphery abutting the shoulder 16. The member 18 has a cylindrical extension 19 concentrically positioned in and extending toward the housing outer end. The casing 17 has a hollow cup-like bottom member 20 with its rim 21 seating against the outer edge portion of the cover member 18. Extending across the cover member 18 within the casing 17 there is a flexible resilient diaphragm 22 of vulcanized gum rubber or rubber-like material, such as Ameripol, which has its marginal surrounding edge portion tightly clamped and sealed between the rim 21 and the cover member 18. The casing bottom and cover members are rigidly and tightly clamped together and to the housing shoulder 16 by turning over the housing end edge portion 23 upon the outer shoulder of the rim 21. Within and filling the casing 17 there is a temperature responsive pressure creating material 24 such, for example, as the preformed pellet in Patent 2,259,846 wherein the material is of crystalline nature, undergoing a change of state in its operating range. Extending longitudinally through the extension 19 and the cover member 18, there is a bore 25 closed by the diaphragm 22 and in which is guided a hollow recessed piston 26. The closed end of the piston 26 facing the bottom member 20, seats on a sealing plug 27 of pliable elastic material, such as Ameripol or vulcanized gum rubber which is supported on the diaphragm 22 and by the material 24. The plug 27 and the outer surface of the diaphragm 22 are coated with lubricant, such as Vistanex, which is held or retained by the plug between the plug and the diaphragm so that lubrication is provided for these rubbing surfaces and for the surfaces of the plug and diaphragm which frictionally contact the member 18. The bore 25 has a truncated conical portion 28 diverging from inward of the innermost position of the piston 26 toward the diaphragm 22 and opening into an enlarged diameter bore portion 29, such that the plug 27 is held under compression and holds the piston 26 out of the conical portion 28 at all temperatures of the material 24. Cooperable with the piston 26 there is a push rod or plunger 30 having a hollow cylindrical end portion 31 formed by an end recess 32 opening toward the piston recess. The portion 31 is sleeved over the cover member extension 19 which guides the reciprocal movement of the rod 30. Positioned between the rod 30 and the piston 26 there is a cylindrical thrust member 33 which seats at its ends against the bases of the piston and rod recesses and serves to transmit movement between the piston 26 and the rod 30. The rod portion 31 has at its inner end a laterally surrounding flange 34 which substantially fits the bore of the housing 14 and which receives and supports the inner end of the helical coil spring 35 surrounding the rod 30. Seated on and closing the end of the housing 14 opposite the casing 17, there is a cap member 36 having an annular surrounding flange 37 and holding the spring 35 under compression. The flange 37 is clamped to the housing 14 to hold the cap member rigidly in rotatably adjusted position by a ring nut 38 screw-threaded onto the housing 14. The cap member 36 has a central aperture 39 therethrough in and through which the rod 30 is guided for reciprocation. The rod 30 is also guided at its inner end by the flange 34 and therefore the thrust member 33 serves as a universal connection between the guided piston 26 and the rod 30. Mounted on the cap member 36 there is a supporting bracket 40 to which is pivotally connected or fulcrumed, by a pivot pin 41, an operating lever 42. A plurality of metal bars or straps riveted together comprise the lever 42 which is connected to the external end of the rod 30 by a pin and slot connection, as at 43.

The free end of the lever 42 is pivotally connected by a pin 44 to one end of a thrust or connecting rod 45. Slidable on the rod 45 there is a spring follower member or sleeve 46 held against a stop nut 47 by a lost motion spring 48 surrounding the rod 45 and seating against a collar 49 fixed on the rod 45. The sleeve 46 has a stub shaft 50 which is journaled in a crank arm 51 rigid with and extending radially from the shutter operating shaft 52. The shutters 4 are individually supported for rotation and are connected together for movement in unison by a link 53 or similar mechanism.

The operation of the apparatus is as follows: While the temperature of the lubricating oil is below the temperature at which cooling is desired, say 130° F., the valve 7 will be in open position so that the oil will flow from the inlet 2 to and through the outlet port 5 and from the outlet 3, by-passing the cooling surface in the cooler 1. When the oil temperature reaches 130° F., the valve 7 will be closed so that the oil will be directed through the passes in the cooler and will discharge therefrom through the outlet 8 into the chamber 9. The oil entering chamber 9 will be deflected by the baffle 54 to impinge on the thermostat casing 17 and thence flow through the check valve port 10 and over the thermostatic valve 7 on its way to the outlet 3. As the oil temperature increases above 130° F., the thermostatic material 24 will expand and acting through the diaphragm 22 and the plug 27 will overcome the spring 35 and force the piston 26 and rod 30 outward, thereby moving the connecting rod 45 toward the right of Figs. 1 and 4 and outward from the plane of the drawings, Fig. 2. This movement of the rod 45 will rotate the shutter shaft 52 in a clockwise direction so that the link 53 will be moved toward the right of Fig. 3, thus opening the shutters 4. If the oil temperature should continue to increase irrespective of the air flow through the cooler 1, then the shutters will have continued opening movement due to the continued expansion of the material 24. It will be apparent that the thermostatic device 13 will throttle the air flow to the cooler 1 at the shutters 4 which will be opened and closed in accordance with the oil temperature in the chamber 9. Should the temperature of the oil increase above that at which the shutters 4 are wide open, say 220° F., then continue expansion of the material 24 and consequent continued movement of the rod 45 will serve merely to collapse the lost motion spring 48. Should the oil temperature decrease toward the initial shutter opening temperature, then the spring 35 will move the piston 26 inward and rotate the shutter shaft 52 counterclockwise, thereby moving the shutters 4 toward closed position.

By utilizing the dam or neck 16$^a$, the rate of heat conduction from the thermostat casing 17 is sufficiently reduced so that even with a minus sixty degree F. temperature around the casing 1 and external of the chamber 9, the thermostatic control will continue to operate efficiently. It may be noted that with extremely low ambient temperatures, the metal of the housing 14 conducts heat so rapidly from the interior of the chamber 9 that some provision such as the neck 16$^a$ is highly desirable in order to have the pellet 24 respond accurately to the temperature of the oil in chamber 9.

Having thus described the invention, what is claimed and desired to be secured by Letters Patent of the United States is:

1. A control device for actuating the shutters of an oil cooling apparatus, comprising a tubular open-ended housing, a casing secured to and closing one end of said housing, temperature responsive material in said casing, a tubular extension concentric with said housing and rigid with said casing and having its bore opening into said casing, a pressure responsive member closing the bore of said extension and confining said material in said casing, thrust means guided in and having a portion surrounding said extension for guided engagement with said housing and cooperable with said responsive member for actuation upon expansion of said material, a helical coil spring in said housing and surrounding said extension and acting at one end against said thrust means in opposition to expansion of said material, a cap member closing the other end of said housing and having an aperture therethrough and holding said spring under compression, said thrust means extending through and guided in said aperture, a bearing support carried externally by said cap member, and a shutter operating lever journaled on said support and operatively connected to said thrust means.

2. A control device for actuating the shutters of an oil cooling apparatus, comprising a tubular open-ended housing, a casing secured to and closing one end of said housing, temperature responsive material in said casing, a tubular extension concentric with said housing and rigid with said casing and having its bore opening into said casing, a pressure responsive member closing the bore of said extension and confining said material in said casing, thrust means guided by and having a portion surrounding said extension for guided engagement with said housing and actuated by said responsive member upon expansion of said material, a helical coil spring in said housing and surrounding said extension and acting at one end against said thrust means in opposition to expansion of said material, a cap member closing the other end of said housing and having an aperture therethrough and holding said spring under compression, said thrust means extending through and guided in said aperture, a bearing support carried externally by said cap member, a shutter operating lever journaled on said support and operatively connected to said thrust means, said cap member being rotatably adjustable to position said lever, and a ring nut clamping said cap member to said housing in adjusted position.

3. A control device comprising a tubular open-ended housing, a thermostat casing secured to and sealing one end of said housing, said casing having a hollow bottom member and a cover member with a tubular extension, a diaphragm clamped between said members, a temperature responsive material filling said bottom member and operable against said diaphragm, said cover member and extension having a guide bore therethrough, a sealing member seating on said diaphragm and positioned in said bore, a piston guided in said bore and seating on said sealing member, a push rod guided in said housing and having an end recess receiving said extension, said piston having an end recess opening toward the base of said rod recess, a thrust member positioned in and seating against the bases of said recesses, a helical coil spring surrounding said push rod and acting thereon to hold said diaphragm against said responsive material, and a lever fulcrumed on said housing and operatively connected to said push rod.

4. A control device comprising a tubular open-ended housing, a thermostat casing secured to and sealing one end of said housing, said casing having a hollow bottom member and a cover member with a tubular extension, a diaphragm clamped between said members, a temperature responsive material filling said bottom member and operable against said diaphragm, said cover member and extension having a guide bore therethrough, a sealing member seating on said diaphragm and positioned in said bore, a piston guided in said bore and seating on said sealing member, a push rod having an end flange guided by the wall of said housing and having an end recess receiving said extension, said piston having an end recess opening toward the base of said rod recess, a thrust member positioned in and seating against the bases of said recesses, a helical coil spring surrounding said push rod and seating on said flange to hold said diaphragm against said responsive material, a cap member rotatably adjustable on said housing and holding said spring under compression, and a lever pivoted on said cap member and having a pin and slot connection with said push rod.

5. A control device comprising a tubular open-ended housing, a rigid thermostat casing secured to and sealing one end of said housing, said casing having a bottom member and a cover member forming a chamber with a tubular extension projecting concentrically into said housing, temperature responsive material in said chamber, pressure responsive means sealing said material in said chamber and the bore of said extension, a piston guided in said bore and seating on said pressure responsive sealing means, a push rod guided in said housing and having an end recess receiving said extension, said piston having an end recess opening toward the base of said rod recess, a thrust member positioned in and seating against the bases of said recesses, and a helical coil spring held under compression by said housing and acting against said rod to resist expansion of said responsive material and to return said piston upon temperature decrease.

6. A control device comprising a tubular open-ended cylindrical housing, a rigid thermostat casing secured to and sealing one end of said housing, said casing having a bottom member and a cover member forming a chamber with a tubular extension projecting concentrically into said housing, temperature responsive material in said chamber, pressure responsive means sealing said material in said chamber and the bore of said extension, a piston guided in said bore and seating on said pressure responsive sealing means, a push rod having an end recess receiving said extension and having an annular flange adjacent the open end of its recess reciprocally fitting the bore of said housing, said piston having an end recess opening toward the base of said rod recess, a thrust member positioned in and seating against the bases of said recesses, a cap member closing the other end of said housing and having an aperture therethrough receiving and guiding said push rod, a helical coil spring seating on said flange and held under compression by said cap member to resist expansion of said responsive material and to return said piston upon temperature decrease.

SERGIUS VERNET.